May 9, 1961  A. D. KELLER  2,983,048
COMPASS
Filed Sept. 10, 1957

INVENTOR.
Adrian D. Keller
BY
*Lynn N Latta*
ATTORNEY

United States Patent Office 2,983,048
Patented May 9, 1961

2,983,048

COMPASS

Adrian D. Keller, 1715 Midvale Ave., Los Angeles, Calif.

Filed Sept. 10, 1957, Ser. No. 683,154

3 Claims. (Cl. 33—27)

This invention relates to drafting compasses and has as its main object to provide an improved compass that can function for scribing small diameter circles as well as large diameter circles. In general, the invention contemplates a compass embodying a radius blade adapted to lie flatly against a surface on which a circle or arc is to be inscribed, said blade having an aperture through which the point of a pencil is adapted to be imbedded for scribing the arc or circle, and having means providing a center point disposed at a distance from said aperture, which distance may be adjusted for varying the radius of the arc or circle to be inscribed.

In general, the invention contemplates a compass wherein a plurality of pencil point receiving apertures are arranged along the length of the radius blade, in equal, measured spacing from one another, and wherein, at one end of the blade, there is provided a center point mounted for adjustment around the common center line of said pencil point receiving apertures, provided with adjusting means for attaining extremely fine adjustments in the positioning of the center point, and having a vernier scale for measuring such fine adjustments. The range of adjustment of the center point is such as to bridge the distance between two adjacent pencil point receiving apertures, so that by selection of an aperture at a given distance from a zero point of adjustment of the center point, the radius as thus measured can be augmented by a fractional amount as determined by adjustment of a center point with reference to its vernier scale.

The main object of my invention is to provide a compass which may utilize the same pencil that is used for general line scribing.

A particular object is to provide an improved construction and arrangement of parts including a radius blade having a longitudinally extending slot, a center point carriage slidably mounted above said slot, a center point mounted in such carriage for vertical movement from an inoperative position elevated above the surface of the work to a lowered position piercing the work surface so as to provide a fixed center for inscribing operation, together with a fine adjustment mechanism operatively connected between the carriage and the end of the beam.

Other objects and advantages will become apparent in the ensuing specifications and appended drawings in which.

Figure 1:
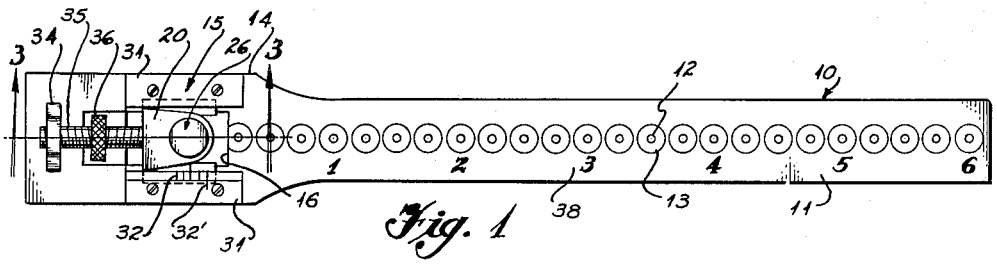
Fig. 1 is a plan view of a compass embodying the invention.
Figure 2:
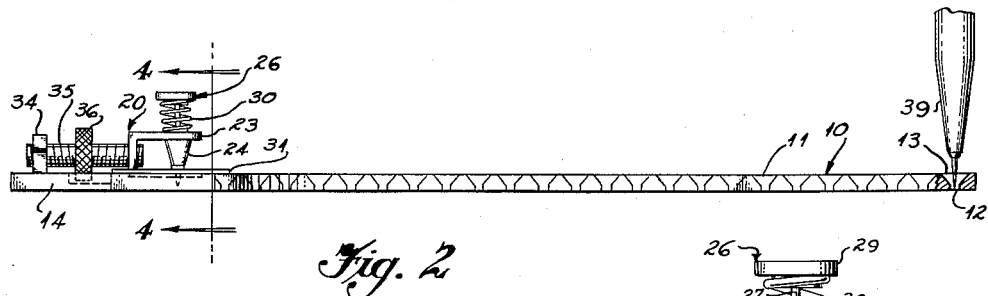
Fig. 2 is a side view of the same, partially in section.
Figure 3:
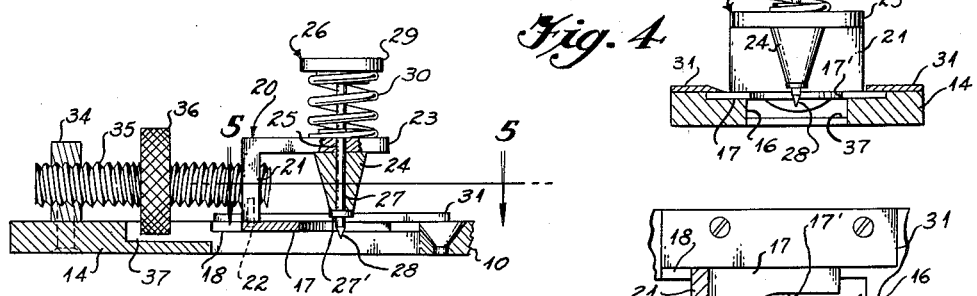
Fig. 3 is a longitudinal vertical sectional view of the end portion of the compass embodying the center point and its carriage and adjustment mechanism.
Figure 4:
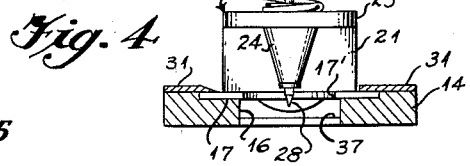
Fig. 4 is a transverse sectional view of the latter taken on the line 4—4 of Fig. 2.
Figure 5:
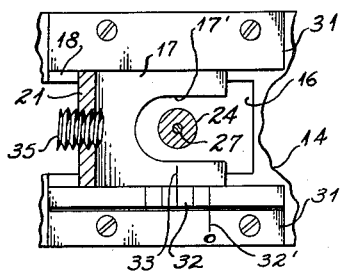
Fig. 5 is a fragmentary plan view, partially in section taken as indicated by the line 5—5 of Fig. 4.
Figure 6:
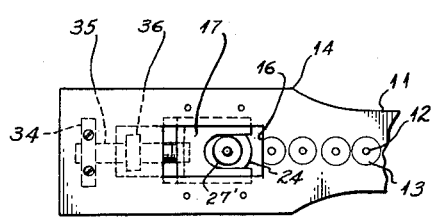
Fig. 6 is a fragmentary plan view of the center point end of the compass with the center point omitted.

Referring now to the drawings in detail, I have shown therein, as an example of one form in which the invention may be embodied, a compass including generally a radius blade 10 which, for the major portion of its length consists in a relatively narrow, straight flat strip 11 having a series of pencil point receiving apertures 12 therein, each of which has a conical mouth 13 to guide the pencil point thereinto. The other end of the blade 10 consists in a widened head 14 upon which is mounted the center point assembly, indicated generally at 15. In the head is an elongated slot 16, arranged on a common longitudinal axis with the row of pencil point receiving apertures 12.

The blade 10 may be formed quite inexpensively, as by a die blanking operation in a punch press, from sheet plastic material, preferably transparent so that the draftsman may have visibility of the work surface through the blade 10, and the conical mouth 13 of the aperture 12 may be reamed after the apertures 12 have been punched.

The center point assembly 15 comprises a carriage including a slide shoe 17 having parallel sides, received in a shoulder recess 18 immediately above the elongated aperture 16, and slidable upon the shoulders defined at the bottom of recess 18. These shoulders, and the side walls of recess 18 thus constitute slideways for accurately guiding the shoe 17 in sliding movement along the axis of the apertures 12. Shoe 17 has an opening or notch 17′ to receive the lower end of the center point 26, hereinafter referred to. The carriage further includes the bracket 20 comprising a vertical leg 21 the lower end of which is suitably secured, as by screws 22 to the rear end of shoe 17, and having a horizontal arm 23 to the lower side of which is brazed or otherwise suitably secured a downwardly extending conical bushing 24. A slide bearing bore 25 extends vertically through arm 23 and bushing 24. A center point 26 has a stem 27 at the lower end of which is a work-piercing point 28 and to the upper end of which is secured a head 29. A coil spring 30 is engaged beneath the bracket arm 23 and head 29 and functions to yieldingly maintain the center point 26 in a normal position in which the point 28 is elevated above the work surface in contact with the under face of the blade 10. Stem 27 has an integral collar 27′, just above the point 28, which normally engages the lower end of bushing 24 to retain the stem 27 against escape from the bracket and to limit downward movement of point 28.

Secured to the upper face of head 14 are a pair of retainer strips 31 which project over the side margins of recess 18 and cooperate with the same to define slide grooves in which the sides of the shoe 17 are confined for longitudinal sliding movement. One of the strips 31 is provided on its upper face with a fine division scale 32 having a zero mark 32′ indicating a starting position. Shoe 17 has on its upper face an indicator mark 33 which cooperates with the scale 32 to indicate the position of center point 26 (mark 33 being directly opposite the axis of point 26).

Secured to and projecting upwardly from the end of head 14 is a nut 34 through which is threaded one end of the right and left hand adjusting screw 35. The other end of screw 35 is threaded through the vertical leg 21 of bracket 20. Screw 35 has a centrally disposed knurled thumb wheel 36 which may be engaged by the thumb or finger of the operator to rotate the screw and effect adjustment between the movable bracket 20 and the fixed nut 34, in a direction determined by the direction of rotation of the screw. The wheel 36 extends into a recess 37 in head 14, arranged as an extension of recess 18 but somewhat deeper than the latter.

The scale 32 has fractional spacings extending from zero mark 32′ in one direction, for addition to the basic distance as measured between the zero mark 32′ and the various apertures 12. The arm 11 of the blade is provided with a base scale 38 to indicate the distances of the apertures 12 from the zero mark 32'. Scale 38 may consist in a series of quarter inch marks and inch numerals on a conventional inch scale, with the apertures 12 located at quarter inch intervals. It will be understood that any selected aperture spacing and base scale may be utilized.

In the operation of the instrument, it is placed over a center mark on the work surface (e.g. defined by crossed horizontal and vertical lines) and the point 28 is inserted into the work at this center mark. The location of the center point 26 in register with the center mark may be attained by adjusting the center point 26 to the zero point as indicated by the zero mark 32' in coincidence with the vertical locating line on the work surface and with the line of apertures 12 centered over the horizontal locating line of the work surface. The center point is then depressed by finger pressure against the head 27, so as to pierce the work surface with the point 28. Having thus attached the center point to the work surface, adjustment of the screw 35 may be effected until the desired fractional spacing as read by indicator mark 33 against the fine scale 32, is attained. The point of a pencil 39 is then inserted through a selected aperture 12 as indicated on the scale 38, and while holding the center point 26 with one hand steady, the other hand is used to hold the pencil 39 and scribe an arc or circle around the center point 26.

The bar 10 may be made extensible by use of an extension, detachably attached to its free end and provided with apertures corresponding to those of blade 10.

I claim:

1. In a drafting compass, a blade having a plurality of pencil point receiving apertures arranged along the longitudinal axis thereof and providing a broken view of a horizontal layout line on a drawing, said blade having at one end a head provided with an elongated slot aligned with said row of apertures; said head having in its upper face an elongated recess extending beyond the side margins of said slot; a pair of retainer strips secured to the upper face of said head and extending over the sides of said recess to define therewith a pair of slide grooves; a center point carriage having side portions received in said slide grooves for guiding said carriage in sliding movement along said longitudinal axis; a center point mounted in said carriage for vertical movement and having at its lower end a point adapted for penetration of a work surface upon being moved downwardly; means yieldingly acting on said center point to elevate the same to a normal position in which its said point is raised above the work surface; adjusting screw means operating between said carriage and the end of said head for effecting fine adjustment of said blade with reference to said carriage for fractional spacing thereof with reference to said apertures; a zero mark on the upper face of said head, for alignment with a vertical layout mark on said drawing, whereby to initially locate said blade and head in a predetermined relation to the intersection of said horizontal and vertical layout lines; and scale means comprising a mark on said carriage adapted to be located in adjacent alignment with said zero mark to accurately position the axis of said center point in intersecting relation to the intersection of said layout lines on the drawing when said blade and head are initially located as aforesaid, said scale means further including scale markings to indicate fractional positioning of said blade and head in adjusted relation to said carriage through the operation of said adjusting screw means after location of said center point as aforesaid; and a scale to indicate the fractional positioning of said carriage, one of said retainer strips being provided with said scale and said carriage having an indicator mark cooperating with said scale, said carriage comprising a shoe slidable in said slide grooves, a bracket of L-form including a vertical leg secured to the rear end of said shoe and projecting upwardly and including a horizontal leg projecting over said shoe and a slide bushing projecting downwardly from said horizontal leg, said center point including a stem slidably extending through said horizontal leg and said bushing.

2. A compass as defined in claim 1, wherein said center point includes a head secured to the upper end of said stem and wherein said yielding means comprises a coil spring interposed under compression between said head and the upper face of said horizontal leg of the bracket.

3. A compass as defined in claim 2, wherein said fine adjustment means comprises a right and left hand screw including one end portion threaded through said vertical leg of the bracket, and including a nut secured to and projecting upwardly from the end of said head of the beam, the other end portion of said screw being threaded through said nut, and said head having a recess constituting a rearward extension of the aforesaid recess, said screw having a centrally disposed integral thumb wheel the lower portion of which is received in said recess.

References Cited in the file of this patent

UNITED STATES PATENTS

| | | |
|---|---|---|
| 1,170,174 | Matson | Feb. 1, 1916 |
| 1,341,457 | Costovicci | May 25, 1920 |
| 1,436,471 | Bell | Nov. 21, 1922 |
| 2,269,505 | Anderson | Jan. 13, 1942 |
| 2,542,537 | Klemm | Feb. 20, 1951 |
| 2,581,858 | Hilt et al. | Jan. 8, 1952 |

FOREIGN PATENTS

| | | |
|---|---|---|
| 494,479 | France | May 31, 1919 |